(12) United States Patent
Ashby

(10) Patent No.: US 6,970,842 B1
(45) Date of Patent: Nov. 29, 2005

(54) PROJECT DOCKET MANAGEMENT APPARATUS AND METHOD

(75) Inventor: David C. Ashby, Los Altos, CA (US)

(73) Assignee: Halo Management, LLC, Los Altos, CA (US)

( * ) Notice: Subject to any disclaimer, the term of this patent is extended or adjusted under 35 U.S.C. 154(b) by 493 days.

(21) Appl. No.: 09/897,593

(22) Filed: Jun. 29, 2001

Related U.S. Application Data

(63) Continuation-in-part of application No. 09/754,979, filed on Jan. 5, 2001.

(60) Provisional application No. 60/285,743, filed on Apr. 23, 2001, provisional application No. 60/283,144, filed on Apr. 11, 2001, provisional application No. 60/190,824, filed on Mar. 21, 2000.

(51) Int. Cl.[7] .............................................. G06F 17/00
(52) U.S. Cl. .......................... 705/38; 705/67; 713/166
(58) Field of Search ........................ 707/10, 1; 705/26, 705/8, 38, 64, 67, 75; 709/217; 713/166

(56) References Cited

U.S. PATENT DOCUMENTS

| | | | |
|---|---|---|---|
| 5,673,402 A * | 9/1997 | Ryan et al. .................... | 705/38 |
| 5,873,069 A | 2/1999 | Reuhl | |
| 5,873,071 A | 2/1999 | Ferstenberg | |
| 5,895,468 A * | 4/1999 | Whitmyer, Jr. .............. | 707/10 |
| 5,924,082 A | 7/1999 | Silverman | |
| 6,049,801 A | 4/2000 | Whitmyer | |
| 6,076,070 A | 6/2000 | Stack | |
| 6,085,169 A | 7/2000 | Walker | |
| 6,131,087 A | 10/2000 | Luke | |
| 6,182,078 B1 | 1/2001 | Whitmyer | |
| 6,205,435 B1 * | 3/2001 | Biffar .......................... | 705/41 |

(Continued)

FOREIGN PATENT DOCUMENTS

| | | |
|---|---|---|
| WO | WO 97/16797 | 5/1997 |
| WO | WO002080039 A1 * | 10/2002 |

OTHER PUBLICATIONS

IBM Technical Disclosure Bulletin; Title: Security Feature for Local Area Network Switches; Sep. 1996; vol. 39.*

Primary Examiner—Elisca Pierre Eddy
(74) Attorney, Agent, or Firm—IP Strategy Group, P.C.

(57) ABSTRACT

An exemplary embodiment of a project docket management apparatus includes a processor configured to execute a control program and communicate with a user. In a typical aspect, the processor is located in a server computer. The user is one of the personnel assigned to a given project and has authorization to log into the server and access a database of records. The user communicates with the processor to selectively add, edit, modify and delete project records depending on his access level. If the user is an administrator, he has full control over the database records. If the user has a lower access level, he may only be able to view records, for example. The apparatus further includes a notification structure that periodically distributes information to project personnel based on predefined dates or activities. For example, the project personnel may be notified by e-mail when a date deadline is approaching, or when an action has been authorized or completed. Advantages of the invention include the ability provide flexibility and capabilities of managing tasks, events and due dates, while communicating the updated information to all necessary project personnel. In addition, the ability to control access to authorized personnel at various levels allows users to selectively add, edit, modify and delete project records depending on their access level. Finally, the ability to selectively notify the project personnel based on predefined dated or activities keeps all personnel up to date on the project.

22 Claims, 16 Drawing Sheets

U.S. PATENT DOCUMENTS

| | | |
|---|---|---|
| 6,356,878 B1 | 3/2002 | Walker |
| 6,363,361 B1 | 3/2002 | Lundberg |
| 6,466,919 B1 | 10/2002 | Walker |
| 6,549,894 B1 * | 4/2003 | Simpson et al. .............. 707/1 |
| 6,571,141 B1 * | 5/2003 | Brown ...................... 700/86 |
| 2003/0061150 A1 | 3/2003 | Kocher |

* cited by examiner

User Data Table — 26a

User A — 26a-A
    Name
    Title
    Address
    Group
    Company
    Projects + Access Levels

User B — 26a-B
    Name
    Title
    Address
    Group
    Company
    Projects + Access Levels

• • •

User N — 26a-N
    Name
    Title
    Address
    Group
    Company
    Projects + Access Levels

FIG. 1B

Project Data Table — 26b

Record A — 26b-A
    Project Title
    Project Start
    Project Type
    Project Status
    Docket Number
    Services Types
    Project Description

Record B — 26b-B
    Project Title
    Project Start
    Project Type
    Project Status
    Docket Number
    Services Types
    Project Description

• • •

Record N — 26b-N
    Project Title
    Project Start
    Project Type
    Project Status
    Docket Number
    Services Types
    Project Description

FIG. 1C

Administrator Control Panel -- All Personnel

| Name | Position | Group | Access Level | e-mail |
|---|---|---|---|---|
| John Smith | Manager | ABC | 3 | john@abc.com |
| Jay Jones | Analyst | ABC | 2 | jay@abc.com |
| Sue Simmons | Client | ABC | 1 | sue@client.com |
| ... | | | | |
| Hal Klutz | Admin | LMN | 4 | hal@klutz.com |

Legend
Access Level 1 - client level
Access Level 2 - working group level
Access Level 3 - manager level
Access Level 4 - admin level

| | | |
|---|---|---|
| Title | E-mail | Price Willing To Pay |
| RFQ Deadline<br>MM/DD/YY | Category<br>Select | Day, Time For Transactions |
| Description | | Bulk Parameters |
| | | Other Parameters |
| Submit | | |

210

Contract Terms Sheet

| Contract | Buyer | Seller |
|---|---|---|
| Term 1 | OK | OK |
| Term 2 | OK | OK |
| Term 3 | OK | OK |
| Term N | OK | OK |
| | Buyer Agreed | Seller Agreed |

Contract Term Details

| Term | Text | Buyer | Seller |
|---|---|---|---|
| 1 | Term 1 Text | Modify? / OK | Modify? / OK |
| 2 | Term 2 Text | Modify? / OK | Modify? / OK |
| 3 | Term 3 Text | Modify? / OK | Modify? / OK |
| N | Term N Text | Modify? / OK | Modify? / OK |

FIG. 6B

Contract Terms Sheet

| Stage | Buyer | Seller |
|---|---|---|
| 1 | Advance Payment | |
| 2 | Payment 1 | Deliverable 1 |
| 3 | Payment 2 | Deliverable 2 |
| N | Payment N | Deliverable N |
| | Buyer Agreed | Seller Agreed |

FIG. 7A

Escrow Sheet

| Stage | Buyer | Deposited? | Seller | Delivered? |
|---|---|---|---|---|
| 1 | Advance Payment | Y N | | Y N |
| 2 | Payment 1 | Y N | Deliverable 1 | Y N |
| 3 | Payment 2 | Y N | Deliverable 2 | Y N |
| N | Payment N | Y N | Deliverable N | Y N |
| | Buyer Completed | Y N | Seller Completed | Y N |

FIG. 7B

Contract Term Sheet For License

| Stage | Buyer | Seller | Royalty Schedule |
|---|---|---|---|
| 1 | Initial Payment | Initial Time Period | Quantity & Royalty |
| 2 | Payment 1 | Time Period 1 | Quantity & Royalty |
| 3 | Payment 2 | Time Period 2 | Quantity & Royalty |
| N | Payment N | Time Period N | Quantity & Royalty |
|   | Buyer Agreed | Seller Agreed |   |

FIG. 7C

Escrow Sheet

| Stage | Buyer | Deposited? | Seller | OK? |
|---|---|---|---|---|
| 1 | Advance Payment | Y N |   | Y N |
| 2 | Payment 1 | Y N | Time Period 1 | Y N |
| 3 | Payment 2 | Y N | Time Period 2 | Y N |
| N | Payment N | Y N | Time Period N | Y N |
|   | Buyer Completed | Y N | Seller Completed | Y N |

FIG. 7D

New Project Manager Entry Panel          Project No.
                                                  2

| | | |
|---|---|---|
| Project Title | Semiconductor | Edit |
| Project Type | Patent Application | File With Patent Office |
| Docket No. | ABC-101-US | |
| Filing Date | April 11, 2001 | Document — c:\patapp.doc |
| Ser. No. | None Yet | Uploaded — April 11, 2001 |
| Client | ABC Industries | |
| Inventor(s) | J. Smith, B. Jones | |

New Project Manager Entry Panel          Project No.
                                                  5

| | | |
|---|---|---|
| Project Title | Computer LMN | Edit |
| Project Type | Defensive Publication | Publish To Internet |
| Docket No. | DEF-101-US | |
| Pub. Date | April 11, 2001 | Document — c:\defpub.doc |
| Doc. No | None Yet | Uploaded — April 11, 2001 |
| Client | ABC Industries | |
| Inventor(s) | J. Smith, B. Jones | |

New Project Manager Entry Panel      <u>Project No.</u>
8

| | | | |
|---|---|---|---|
| Project Title | SQL Software | Edit | |
| Project Type | License Agreement | | |
| Docket No. | ABC-101-US | Client | ABC Industries |
| Agreement Date | April 11, 2001 | Document | c:\license.pdf |
| Patent No. | 5,477,922 | Uploaded | April 11, 2001 |
| Royalty Schedule | Quarterly | Status | Payments Current |
| Next Payment Due | September 30, 2001 | Next Notification | September 1, 2001 |

Project Manager Control Panel      <u>Project No.</u>
14

| | | | |
|---|---|---|---|
| Project Title | ABC Trademark | Edit | |
| Project Type | Trademark Application | | |
| Docket No. | XYZ-579-US | Client | ABC Industries |
| Filing Date | April 3, 1995 | Status | Issued |
| Ser. No. | 76/876,234 | Issue Date | July 16, 2000 |
| Trademark No. | 2,956,987 | Renewal Due | July 16, 2005 |
| Image | c:\image.jpg | Next Notification | August 15, 2001 |

— 330

Client Project Approval

| | | | |
|---|---|---|---|
| Renewal Date | July 16, 2005 | | Approve Renewal Payment |

— 332

Project Manager Control Panel — Project No. 22

| | | | |
|---|---|---|---|
| Project Title | Superconductor | | Edit |
| Project Type | Patent Application | | |
| Docket No. | ABC-410-US | Client | ABC Industries |
| Filing Date | July 16, 2000 | Status | Office Action 1 |
| Ser. No. | 09/876,234 | Mail Date | July 1, 2001 |
| Patent No. | None Yet | Resp. Due | October 1, 2001 |
| Inventor(s) | J. Smith, B. Jones | Next Notification | August 15, 2001 |

Client Project Approval

| | | |
|---|---|---|
| Foreign Filing Deadline | July 16, 2001 | Approve PCT Filing |

FIG. 13

Project Manager Control Panel — Project No. 41

| | | | |
|---|---|---|---|
| Project Title | Superconductor | | Edit |
| Project Type | Patent Application | | |
| Docket No. | ABC-410-US | Client | ABC Industries |
| Filing Date | July 16, 2000 | Status | Office Action 1 |
| Ser. No. | 09/876,234 | Mail Date | July 1, 2001 |
| Patent No. | 6,546,987 | Resp. Due | October 1, 2001 |
| Inventor(s) | J. Smith, B. Jones | Next Notification | August 15, 2001 |

Client Project Approval

| | | |
|---|---|---|
| Maintenance Fee Due | July 16, 2001 | Approve Payment |

FIG. 14

Project Manager Control Panel

Project No.
28

| | | | |
|---|---|---|---|
| Project Title | Superconductor | | Edit |
| Project Type | Patent Application | | |
| Docket No. | ABC-410-US | Client | ABC Industries |
| Filing Date | July 16, 2000 | Status | Office Action 1 |
| Ser. No. | 09/876,234 | Mail Date | July 1, 2001 |
| Patent No. | 6,546,987 | Resp. Due | October 1, 2001 |
| Inventor(s) | J. Smith, B. Jones | Next Notification | August 15, 2001 |

360

| | | | |
|---|---|---|---|
| Patent Application | pat_ap.doc | Second Office Action | oa_2.doc |
| Application Figures | pat_ap.fig | Second Amendment | am_2.doc |
| Filing Papers | filing_papers.pdf | Examiner's Amendment | am_ex.doc |
| First Office Action | oa_1.doc | Notice of Allowance | noa.pdf |
| First Amendment | am_1.doc | Issue Fee Transmittal | issue_xmittal.pdf |
| First Amendment | 6,546,987 | Granted Patent | 6546987.pdf |

Client Project Approval

| | | |
|---|---|---|
| Action Due | July 16, 2001 | Approve Action & Payment |

FIG. 15

```
┌─────────────────────────────────────────────────────────────┐ 400
│ Electronic Document Submission                              │
├─────────────────────────────────────────────────────────────┤
│ <field proj_title type=text $proj_title> Project Title </field>
│
│ <field proj_fig type=figures $proj_figs> Project Figures </field>
│ <field filing_date type=date $filing_month $filing_day $filing_year>
│ Filing Date </field>
│ <field proj_docket type=var $proj_docket> Project Docket Number
│ </field>
│       •
│       •
│       •
└─────────────────────────────────────────────────────────────┘
```

FIG. 16

```
┌─────────────────────────────────────────────────────────────┐ 420
│ Electronic Document Communication (e.g. Reply)              │
├─────────────────────────────────────────────────────────────┤
│ <field proj_title type=text $proj_title> Project Title </field>
│
│ <field proj_fig type=figures $proj_figs> Project Figures </field>
│ <field filing_date type=date $filing_month $filing_day $filing_year>
│ Filing Date </field>
│ <field proj_docket type=var $proj_docket> Project Docket Number
│ </field>
│       •
│       •
│       •
├─────────────────────────────────────────────────────────────┤
│
│ field>
│ <field received_date type=date $received_month $received_day
│ $received_year> Received Date </field>
│ <field next_due_date type=date $next_due_month $next_due_day
│ $next_due_year> Next Due Date </field>
│       •
│       •
│       •
└─────────────────────────────────────────────────────────────┘
```

FIG. 17

PROJECT DOCKET MANAGEMENT APPARATUS AND METHOD

RELATED APPLICATIONS

This application claims priority to U.S. Prov. No. 60/285,743 filed Apr. 23, 2001 and U.S. Prov. No. 60/283,144 filed Apr. 11, 2001, and is a continuation-in-part of U.S. Ser. No. 09/754,979 filed Jan. 5, 2001, claiming priority to U.S. Prov. No. 60/190,824 filed Mar. 21, 2000, all incorporated herein by reference.

FIELD

The invention is related to a project docket management apparatus and method. In particular, the invention provides a computer structure that manages tasks, events and due dates and communicates with users to efficiently manage projects.

BACKGROUND

Project management is a difficult task. Traditional techniques for managing projects include numerous printed status reports that are then distributed to a number of personnel on the project. When a project status change occurs, the status reports are reprinted and redistributed to the personnel.

The advent of computers and telecommunications systems, such as the Internet, has improved project management considerably. A number of software vendors offer project management tools where the status reports can be e-mailed to the project personnel. However, these tools do not address many needs that arise with complex project management. In particular, there are a number of complex projects, such as intellectual property identification, prosecution and management that have special requirements and often cannot be satisfied with conventional software.

A number of software vendors offer some specialized project management tools that are designed for stand-alone systems. The advantage is that these tools can be customized for the user's needs, but the tools don't necessarily provide a variety of access levels to project personnel, project deadline notification, communication with other computer systems and other features that would increase knowledge and productivity among the project personnel.

The invention overcomes the identified limitations and provides a project docket management system that is flexible and capable of managing tasks, events and due dates, while communicating the updated information to all necessary project personnel.

SUMMARY

The invention overcomes the identified limitations and provides a project docket management system that is flexible and capable of managing tasks, events and due dates, while communicating the updated information to all necessary project personnel. In addition, the invention selectively provides access to authorized personnel at various levels who can selectively add, edit, modify and delete project records depending on their access level.

An exemplary embodiment of a project docket management apparatus includes a processor configured to execute a control program and communicate with a user. In a typical aspect, the processor is located in a server computer. The user is one of the personnel assigned to a given project and has authorization to log into the server and access a database of records. The user communicates with the processor to selectively add, edit, modify and delete project records depending on his access level. If the user is an administrator, he has full control over the database records. If the user has a lower access level, he may only be able to view records, for example. The apparatus further includes a notification structure that periodically distributes information to project personnel based on predefined dates or activities. For example, the project personnel may be notified by e-mail when a date deadline is approaching, or when an action has been authorized or completed. In one aspect, a working group calendar is updated. In another aspect, certain personnel are notified depending on their attributes such as position, group or access level, for example, the client is notified of a request for approval.

In one aspect of the invention, one of the users is a service provider and another user is a client. The service provider is an administrator with full control over the database records while the client has restricted access permission and may only view the records. The notification structure distributes information to the users regarding certain tasks, accomplishments and upcoming due dates. Additionally, the client has the ability to authorize certain activities such as the filing of patent applications in specific countries, etc. One the notification is made and the authorization received, the service provider can take action to complete the tasks based on the authorized instructions.

In yet another aspect of the invention, various contracts that may include licenses can be stored and tracked. Often times, licenses grant parties patent rights that are useful to track in a project management system. This aspect includes the ability to track contracts and respective rights and obligations including payments in and payments out.

In many cases, service providers require an advance payment before performing certain tasks. To accommodate this need, one aspect of the invention employs an escrow function that records a payment by the client to an escrow account and notifies the service provider that the funds are available upon completion of the task. Once the task is performed the client releases payment to the service provider. In this manner, the service provider knows that the funds are available and the client knows that the funds will be disbursed only after the service provider completes the task. In one aspect, the invention incorporates license agreement payment in the escrow function as well as additional features such as a royalty rate calculator.

Advantages of the invention include the ability provide flexibility and capabilities of managing tasks, events and due dates, while communicating the updated information to all necessary project personnel. In addition, the ability to control access to authorized personnel at various levels allows users to selectively add, edit, modify and delete project records depending on their access level. Finally, the ability to selectively notify the project personnel based on predefined dated or activities keeps all personnel up to date on the project.

BRIEF DESCRIPTION OF THE FIGURES

The invention will be understood with reference to the following figures.

FIG. 1B depicts a personnel data table according to an embodiment of the invention;

FIG. 1C depicts a project data table according to an embodiment of the invention;

FIGS. 6A–B are sample screen displays of a contract terms sheet according to an embodiment of the invention;

FIGS. 7A–D are a sample screen displays for an escrow terms sheet according to an embodiment of the invention;

FIGS. 9–15 show sample screen displays for new projects and project management according to embodiments of the invention;

FIGS. 16–17 show exemplary electronic communications between a project management apparatus and another project computer, for example, a government computer that provides confirmation of a filing date and responsive electronic communications.

DETAILED DESCRIPTION

The invention is described with reference to exemplary embodiments. Those skilled in the art will recognize that variations can be made to the description while remaining within the bounds of the claims.

A. Architecture

Figure 1A:
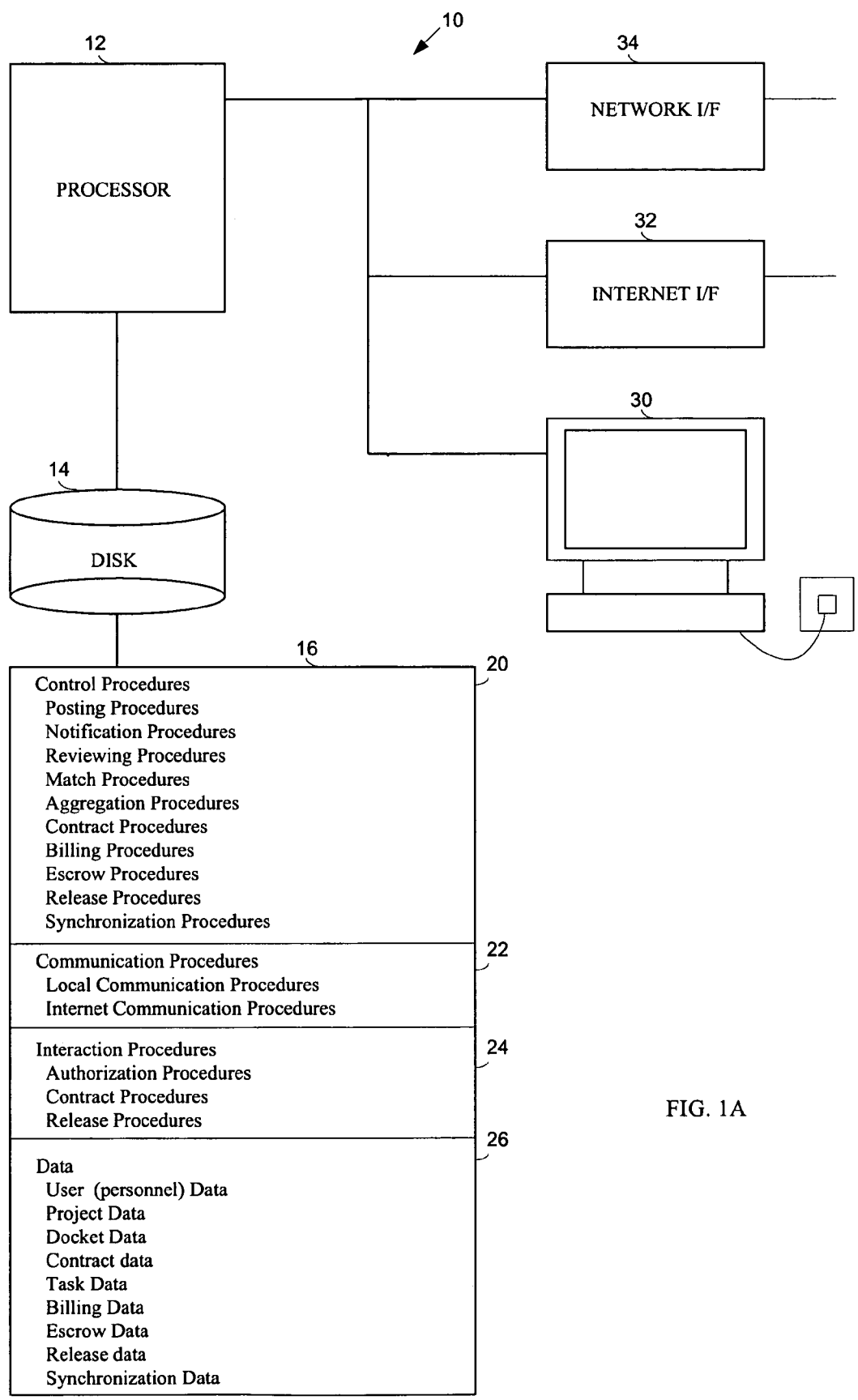
FIG. 1A depicts a computer system according to an embodiment of the invention.

FIG. 1A depicts a computer server 10 for performing the invention according to an embodiment of the invention. The computer includes a processor 12 coupled to a memory 12. The memory contains a data structure 14 further comprising a plurality of software structures including control procedures, communication procedures and data. The processor is further coupled to a user interface 30, an Internet communication interface 32 and a network interface 34.

An exemplary project docket management apparatus includes processor 12 configured to execute control procedures 20 and communicate with a user. In a typical aspect, the processor is located in a server computer. The user is one of the personnel assigned to a given project and has authorization to log into the server and access a database 26 of records. The user communicates with the processor to selectively add, edit, modify and delete project records depending on his access level. If the user is an administrator, he has full control over the database records. If the user has a lower access level, he may only be able to view records, for example. The apparatus further includes a notification structure that periodically distributes information to project personnel based on predefined dates or activities. For example, the project personnel may be notified by e-mail when a date deadline is approaching, or when an action has been authorized or completed. In one aspect, a working group calendar is updated. In another aspect, certain personnel are notified depending on their attributes such as position, group or access level, for example, the client is notified of a request for approval.

FIG. 1B depicts a personnel data table 26a according to an embodiment of the invention. The data table 26a includes a number of personnel records 26a-1, 26a-2 to 26a–n. These personnel records store the information including each user's name, title, address, contact information, project information (e.g. which projects each user is assigned to) and other data. The data is stored in a relational database model that links the personnel table 26a to other data tables used in the invention.

FIG. 1C depicts a project data table 26b according to an embodiment of the invention. The data table 26b includes a number of project records 26b-1, 26b-2 to 26b–n. These project records store the project information including the title, start date, type, status, docket, description, personnel and other information. The data is stored in a relational database model that links the personnel table 26a to the project data table 26b.

Figure 2:
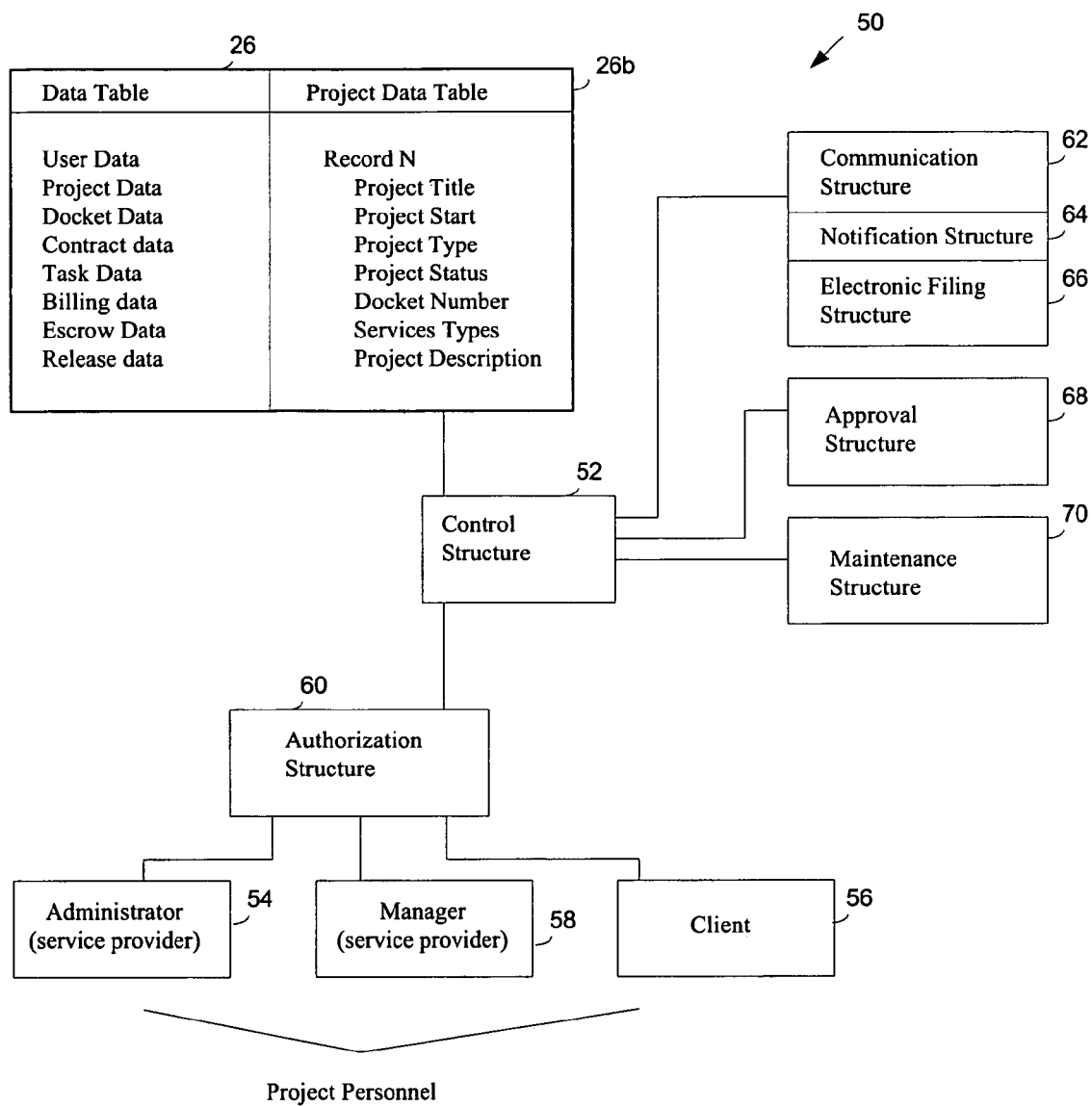
FIG. 2 shows a logical structure of the invention according to an embodiment of the invention.

FIG. 2 shows a logical structure 50 of the invention according to an embodiment of the invention. In this aspect of the invention, one of the users is a service provider and another user is a client. The control structure 52 includes the processor 12 and manages operation of the invention by executing the control procedures 20. The service provider includes an administrator 54 with full control over the database records while the client 56 may only view the records, for example. An additional user 58 has access permissions set by the administrator 54 using the authorization structure 60 (see FIGS. 4A–B). The communication structure 62 is configured to communicate with other network systems and the users. The communication structure is used to transfer files, documents, e-mails and other correspondence. The communication structure includes a notification structure 64 that distributes information to the users regarding certain tasks, accomplishments and upcoming due dates. For example, the project personnel may be notified by e-mail when a date deadline is approaching, or when an action has been authorized or completed. In one aspect, a working group calendar is updated. In another aspect, certain personnel are notified depending on their attributes such as position, group or access level, for example, the client is notified of a request for approval. The communication structure also includes an electronic filing structure 66 allows the users to file documents with other computer systems, for example, government agencies and record the actions. The memory stores information related to the communication including attributes associated with the filed document. The attributes include a date stamp, which may include the time as well. Other attributes include the party or parties to whom the communication is made and other information. Additionally, an approval structure 68 allows the client has the ability to authorize certain activities such as the filing of patent applications in specific countries, etc. One the notification is made and the authorization received, the service provider can take action to complete the tasks based on the authorized instructions. A maintenance structure 70 provides for users to maintain records or other rights or obligations that may be necessary to perfect rights (e.g. paying patent maintenance fees).

Figure 3:
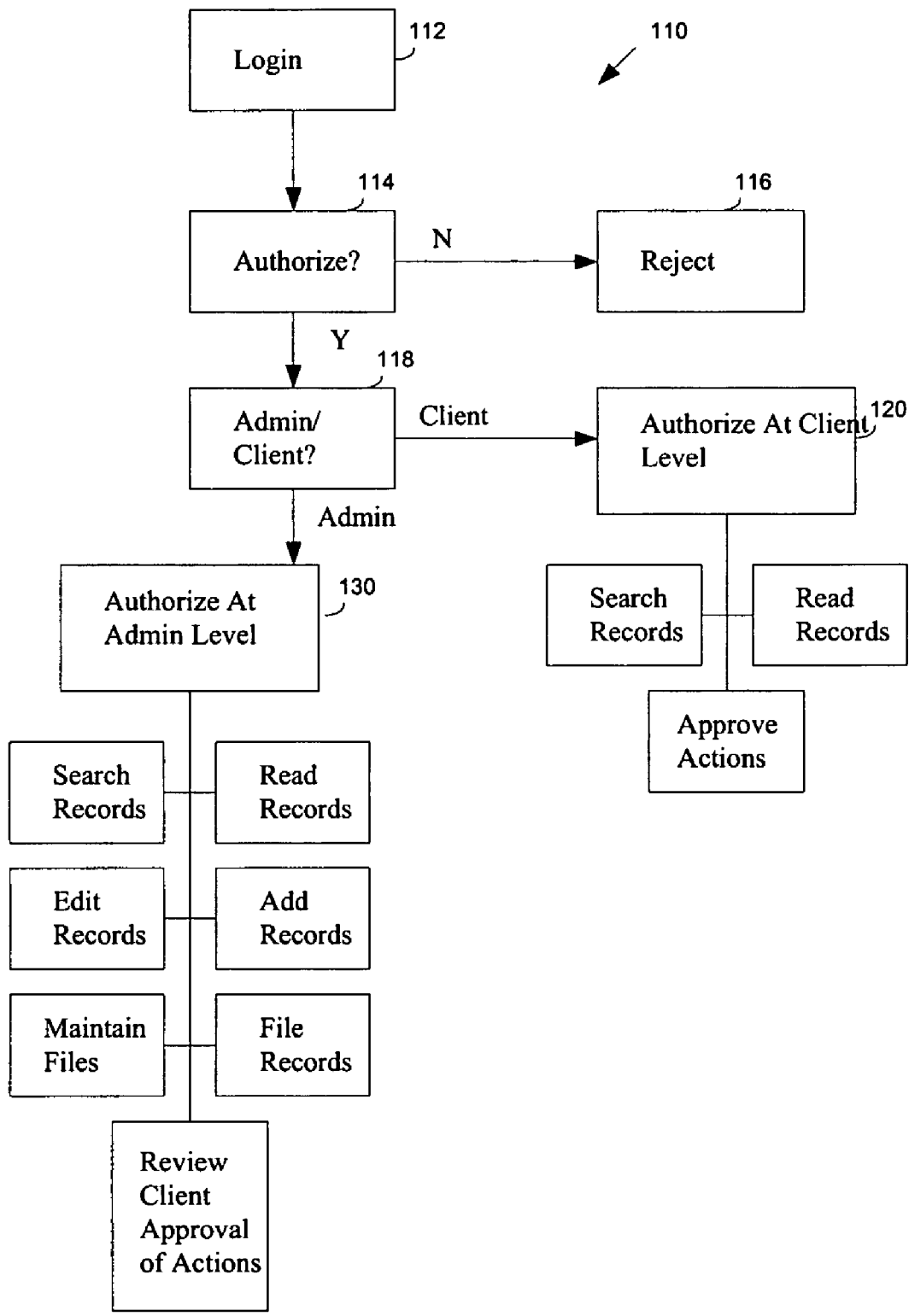
FIG. 3 is a flowchart showing steps for performing the project record access for a client and an administrator according to an embodiment of the invention.

FIG. 3 is a flowchart 110 showing steps for performing the project record access for a client and an administrator according to an embodiment of the invention. At login 112, step 114 determines whether to authorize the login by the user. If the user is not authorized, step 116 rejects the login attempt. Once admitted, step 118 checks the level of access for the given user on the given project. This is done because some users may have different access levels for different projects. If the user is a client, for example, step 118 directs the access to step 120 to authorize the user to the client level for the given project. In this example, the client can read and search the project records, and approve actions such as paying a maintenance fee. If the user is an administrator, for example, step 118 directs the access to step 130 to authorize the user to the administrator level for the given project. In this example, the administrator can read and search the project records, add and edit the records, maintain the files and file records and can review client approval of actions. Other access levels can also be granted to various project personnel as further described herein.

Figures 4A, 4B:
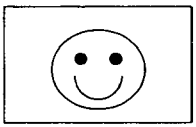
FIGS. 4A–B are exemplary administration screens for adding personnel to a project and for granting or modifying personnel access levels.

FIGS. 4A–B are exemplary administration control panels for adding personnel to a project and for granting or modifying certain attributes such as personnel access levels. FIG. 4A depicts a screen 150 that is accessible to an administrator. The screen shows a list of all personnel on a given project and categorizes the users by name, position, group, access level, etc. The information displayed on this panel is retrieved from the personnel data table 26a. If the administrator highlights a particular user (e.g. by a highlighted hyperlink), the FIG. 4B panel 160 is displayed showing the attributes for that particular user. In the exemplary case, John Smith is selected and detailed data is displayed including his address, contact information, company, group and photo. A number of projects 172a–172n are displayed with corresponding access levels for each project 174a–174n. The administrator can add or modify the projects assigned to John Smith and the access levels for each assigned project. In this manner, each of the users is granted specific access to particular projects and critical information such as trade secrets are maintained. This also allows the selective notification of project personnel based on their attributes such as position, group or access level.

B. Contract Terms and Payment Schedules

Figures 5, 8:
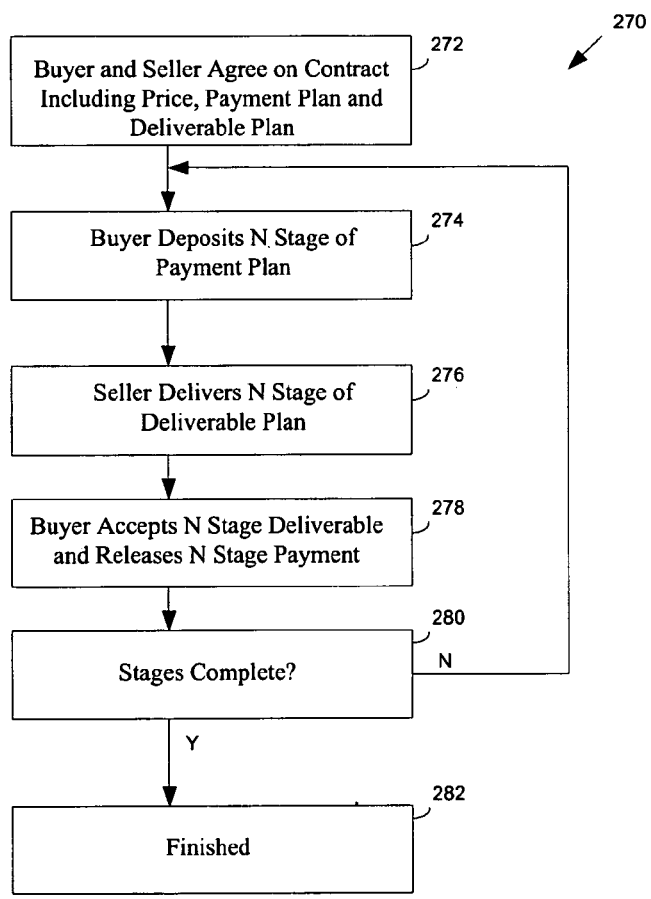
FIG. 5 is a sample screen display for a service buyer to subscribe to the service exchange according to an embodiment of the invention.
FIG. 8 is a flowchart showing steps for parties to agree to contract terms according to an embodiment of the invention.

One aspect of the invention involves the bargaining for goods and services that are attendant to a project. This section describes how the invention automates the process for the buyer and seller, who can then use the project manager to ensure that their project goals and deadlines are met. Referring back to FIG. 1A, the memory storage structure 16 includes a number of contract procedures, escrow procedures and release procedures. These procedures are used in combination with the other procedures and data in this aspect of the invention. FIG. 5 is a sample screen display 200 for a buyer to subscribe to a service exchange according to an embodiment of the invention. The display 200 includes a number of fields to be completed including a project title, Request for Quotes (RFQ) deadline date, e-mail contact information, a category, pricing, description, etc. The server 10 stores this information and makes it available to potential sellers over a network, such as the Internet. In one aspect, the invention compares the buy fields to a number of previously stored sell fields to determine whether an immediate match is available. Once the buyer and seller agree to do business with one another, the invention provides a technique for developing a binding contract.

FIGS. 6A–B are sample screen displays of a contract terms sheet according to an embodiment of the invention. When a buyer and seller have agreed to transact business, the buyer and seller agree upon a contract terms sheet 210 and 220 shown in FIGS. 6A–B (described in detail below) that includes a payment plan and a deliverables plan.

FIG. 6A shows a proposed contract terms sheet screen 210 in which the buyer and seller agree on contract terms for the exchange of a service. These terms include, for example, the legal names of the parties, duration of the contract, cost of the goods and services, location of delivery for the deliverables, the payment plan, warranties, confidentiality provisions, choice of dispute resolution, etc. The buyer and seller each have OK buttons displayed on the screen 210 that they set in order to demonstrate their agreement with each of the terms. If the buyer or seller want to review the specific language of each term or suggest a modification to a term, they can do so on screen 220 shown in FIG. 6B. The terms identified on screens 210 and 220 include details to be described below with reference to FIGS. 7A–D. Once the parties have agreed to all the terms, they each signify so in FIG. 6A by clicking on the Buyer Agreed and Seller Agreed buttons.

In many cases, service providers require an advance payment before performing certain tasks. To accommodate this need, one aspect of the invention employs an escrow function that records a payment by the client to an escrow account and notifies the service provider that the funds are available upon completion of the task. Once the task is performed the client releases payment to the service provider. In this manner, the service provider knows that the funds are available and the client knows that the funds will be disbursed only after the service provider completes the task. FIGS. 7A–D are a sample screen displays for an escrow terms sheet according to an embodiment of the invention. FIG. 8 is a flowchart showing steps for parties to agree to contract terms according to an embodiment of the invention.

As part of the contract described above with reference to FIGS. 6A–B, the parties negotiate terms related to payment and deliverables, as shown in FIG. 7A screen 230, which may be a multi-stage payment plan and multi-stage deliverable plan. This aspect of the invention can include the seller being paid an advance prior to the multi-stage payment plan. In performance of the contract, the buyer deposits an amount of money in an escrow account, according to the agreed upon multi-stage payment plan. The seller performs the stages of the multi-stage performance plan, and when the deliverables are delivered to and approved by the buyer, receives from the escrow account the amount of money equal to the respective stage of the agreed upon multi-stage payment plan.

FIG. 7B shows an implementation of the escrow where the buyer deposits an amount of money in an escrow account, and where the amount of money at least meets the first stage of the multi-stage payment plan. The seller performs the first stage of the multi-stage performance plan, and when the first stage deliverables are delivered to and approved by the buyer, receives from the escrow account the amount of money equal to the first stage of the multi-stage payment plan. This aspect of the invention can include the seller being paid an advance prior to the multi-stage payment plan. As the payments are made and the deliverables are approved, the escrow sheet of FIG. 7B screen 240 fills up and the Y N buttons are lit up and approved.

In an aspect of the invention, the deliverables are intangibles such as rights to a property in the form of a lease or license. In the case of a license, the parties may also negotiate a payment schedule and specific time periods as shown in FIG. 7C screen 250, as well as a specific royalty schedule. In this aspect, the invention can be used to escrow periodic rent payments on a building, or to escrow periodic payments on a license agreement such as an intellectual property license agreement. In such an agreement, the deliverable is the right to use the property for the term specified in the agreement, subject to the multi-stage payment plan. For example, the service or deliverable is an action or inaction taken by the seller to refrain from asserting certain rights (e.g. patent rights) against the buyer. In many cases, payments on an intellectual property license agreement are periodic but vary in amount based on the number of units sold. FIG. 7C screen 250 shows a royalty schedule calculator that can determine the royalty payable based on the terms and conditions of the contract and the payment schedule. For example, often royalty rates are graduated, where the royalty rate is lower as the number of units sold increases, and often royalty rates are based at least in part on the number of units sold in a calendar year. The royalty schedule calculator accepts whatever information is necessary to calculate the royalty, for example the number of units sold, and employs the terms agreed upon in the contract, as shown in screen 210, to provide the proper royalty payment amount. This information is available to both parties so the buyer and seller can acknowledge that the correct payment is made. FIG. 7D screen 260 is similar to screen 240, but the deliverables column has time periods therein to show that in the case of a lease or license, the deliverable is the right to use the property for a given time period. Similar to that described above, with reference to FIG. 7B, as shown in FIG. 7D, the buyer deposits the payments into the escrow account and the seller withdraws the payment from the escrow account, thereby approving the given stage of the multi-stage payment plan.

The aspect of the invention where a contract includes a multi-stage payment and deliverable plan is further described with reference to the FIG. 8 flowchart 270. In step 272, the buyer and seller agree to a contract including a payment plan and deliverables plan. The contract includes a number of stages 1 to N that represent payments by the buyer and deliverables by the seller. The server 10 is configured to store contract data and multi-stage data representing the agreement and a multi-stage payment and deliverable plan. A contract procedure is configured to store the contract terms agreed to between the buyer and seller, as described above with reference to FIGS. 6A–B. An escrow procedure is configured to store a monetary representation of a deposit by the buyer equal to an amount of money in an escrow account, according to the agreed upon multi-stage payment plan. The server 10 includes a release procedure associated with the escrow procedure such that when a deliverable according to the multi-stage deliverables plan is delivered to and approved by the buyer, the release procedure releases from the escrow account the amount of money equal to the respective stage of the agreed upon multi-stage payment plan. FIG. 7B depicts an escrow term sheet 240 that is used by the buyer and seller during the course of the contract to indicate a deposit in escrow, to confirm that the deliverable is acceptable and to secure release of the escrow funds to the seller.

In step 274 the buyer deposits a payment for a particular stage of the agreement in the escrow account. At this point, the seller would see that the advance payment light is active on the escrow display sheet 240 shown in FIG. 7B. The seller would know that the funds are in escrow and that he can begin work on the project. In some cases, the buyer would release the advance payment to the seller in advance of work performed. In the exemplary embodiment, the buyer deposits Payment 1 into escrow, which signifies to the seller that the first payment for a deliverable is in escrow. In step 276, the seller then performs work to create the first deliverable 1 and sends it to the buyer for approval. In step 278, when the buyer accepts and approves the Deliverable 1, money in escrow is released to the seller. Step 280 determines whether the contract is complete. If not, then the buyer deposits Payment 2 into escrow, which signifies to the seller that the second payment for a deliverable is in escrow. The seller then prepares the second deliverable and sends it to the buyer for approval. This continues until the contract is complete, step 282.

C. Project Manager Control Panel

FIGS. 9–14 show sample screen displays for new projects and project management according to embodiments of the invention. The examples given herein describe projects related to managing intellectual property including filing documents with the US Patent & Trademark Office (PTO), responding to official actions from the PTO, paying maintenance fees to ensure the continued enforceability of a patents, etc. While these projects are described in detail, the invention is applicable to any type of project where communication between project personnel is helpful to the success of the project. The invention dockets the due dates and provides electronic notices to all project personnel of the upcoming deadlines. The invention is also particularly useful where the dates of correspondence and specific rules for filing dates, response due dates and the like are critical to the project.

FIG. 9 shows a new project manager entry panel 300 that includes a number of information entries related to a patent application. The panel includes a submit button 302 that indicates "file with patent office." Upon completing filling in the form and uploading the patent application document, the user (e.g. a patent attorney) can electronically file the patent application with the PTO. Other types of actions include filing a trademark application, copyright application, a defensive publication or other action. In the case of a defensive publication project as shown in screen 310, FIG. 10, the document would be published on the Internet with an appropriate date and time stamp that could be used at a later date to verify the publication.

FIG. 11 shows a project manger screen 320 related to a license agreement. The project includes a number of information entries including the agreement date, and the payment schedule and status. In this aspect of the invention, periodic notices can be sent to the licensor and licensee to insure that they calculate the license payments. This is similar to the notices that are sent out on other time-related projects.

FIG. 12 shows a project manager screen 330 related to a trademark application. Screen 330 includes a section 332 that identifies actions needing approval of the client. In this case, the client is asked whether to approve a renewal payment. If the client approves the action, the project personnel in charge of making such payment would be notified and carry out the task.

FIGS. 13 and 14 show project manager screens 340 and 350 related to patent applications. In screen 340, the client can approve filing a patent cooperation treaty (PCT) application and in screen 350, the client can approve payment of a maintenance fee. The ability for the client to automatically approve actions required by upcoming due dates vastly improves the project workflow. The project personnel do not need to locate the client to get oral approval that the client may later say wasn't adequately explained. The invention eliminates the ambiguity of client instructions and increases workflow efficiency.

FIG. 15 shows a project related to a patent application and all the documents that are part of the file. This aspect of the invention captures all the documents relevant to a particular project and makes the documents available to other project personnel as well as for later reference. These documents can represent portions of an electronic correspondence, can be copied from an electronic correspondence, can be scanned and then uploaded into the database, etc.

In an aspect of the invention, the control panel includes links to other documents and database entries. In a case where the invention employs hyperlinks, the text on the control panel is linked to other locations on a network, for example, the Internet. In one example, the assignee's name is hyperlinked to the assignee's Internet home page. In a case where the invention employs such links, for example, a patent number text is hyperlinked to the US Patent and Trademark Office database where the full record is stored for that patent. Such a link would typically look like <field type=db_link $db_location>, where the type is a hyperlink (e.g. database link) and the variable $db_location specifies the uniform resource location (URL) for the link. Often, the variable $db_location will be a data structure or otherwise include additional data components related to the particular action. If the database was one that requires authorized access, the link would look like <field type=db_link $db_location $db_authorization>, where the $db_authorization variable might include an authorized username, password or both.

As described above with reference to FIGS. 4A–B, in one aspect of the invention, the administrator can use the administrative control panel screens 150 and 160 to selectively grant authorization to project personnel to use the system, or to link to specific locations or databases for additional information. For example, if the project was a license agreement as shown in FIG. 11, certain project personnel would have an access level to view all the documents in their entirety (e.g. including financial data), while other project personnel would have restricted access to specific portions of the documents or specific exhibits to the documents.

D. Automated Communication and Docketing

FIGS. 16 and 17 show exemplary electronic communications 400 and 420 between a project management apparatus and another project computer, for example, a government computer that provides confirmation of a filing date and responsive electronic communications.

Since the invention may communicate with other systems that have communication and docketing information, an embodiment of the invention includes the ability to communicate data with other systems. The format for such data is communicated electronically with field designations, e.g. <field name type=date $date_variable(s)>, or other format. For example, one of the important data is due date information. In a first aspect of this embodiment the invention automatically calculates a due date based on an action taken by a user of the system or another group. In a second aspect of this embodiment, the invention receives a due date from another computer system with which the server communicates (e.g. a government office). In the first aspect, the calculation can be, for example, based on the user's submission of a form (e.g. notice of appeal of a patent application) that would then docket two months in which to file an appeal brief, or based on an action from another group (e.g. a government office) for example on the user's receipt of a patent application Office Action that would then docket six months to respond with an amendment (and possibly also include the three-month no fee time period). An additional feature of the second aspect is the ability to automatically schedule certain activities, such as a government inspection that may not necessarily be at a specific date that the invention can calculate, but which may be based on the availability of government personnel who's schedules are available to the government computer and who's appointment date can be communicated automatically to the user system.

For example, if a contractor applies for a building permit at a local city office, he may have 30 days to submit the design. As described above, he may enter the date into the control panel and the invention will notify him when the date is near. In this embodiment, the date calculation and management is handled automatically. When the contractor submits the building permit electronically, <field permit_submit_date type=date $month $day $year>, the government office replies with an electronic communication that includes designated date fields, e.g. <field design_due_date type=date $month $day $year>. If the permit was submitted on Apr. 11, 2001, the permit communication variables would be set to $month=April, $day=11 and $year=2001. The government office response would be due 30 days later so the design due date variables would be set to $month=May, $day=11 and $year=2001.

In addition to docketing of dates, the invention can include important documents that are associated with the project (e.g. see FIG. 15). For example, when the US Patent and Trademark Office (PTO) respond to a patent application filing with an Official Action (OA), the mailing date of the OA is docketed, and the document outlining the Examiner's reasons for the particular OA is also included, and possibly the type of action (e.g. restriction requirement, non-final OA, final OA, etc.). In such an aspect of the invention, there will be additional fields such as document, e.g. <field oa_1 type=text $document $oa_type>, that will accompany the OA's communication. Such a communication can include multiple fields, for example:

<field patent_application type=text $document.pat.ap>
<field oa_1 type=text $document.oa.ap $oa_type>
<field oa_mailed type=date $month $day $year >
<field oa_resp_due type=date $month $day $year >

These field are typically consolidated into a message similar to that shown in FIGS. 16 and 17 where the electronic communications include many fields that are designated by name and type. FIG. 15 shows that these communications can be included in the invention, categorized and stored for easy access, retrieval and archival.

In addition to text, date, etc., other fields can be used to enable hyperlinking or database linking. For example, a hyperlink would be passed as <field type=link $hyperlink>. In a database technique, for example, a field can be used that provides a link from a remote database to a local database so that links can be established on the control panel, as discussed above with reference to the project manager control panel FIG. 15. Such a link would typically look like <field type=db_link $db_location>, where the type is a hyperlink (e.g. database link) and the variable $db_location specifies the uniform resource location (URL) for the link. Often, the variable $db_location will be a data structure or otherwise include additional data components related to the particular action. If the database was one that requires authorized access, the link would look like <field type=db_link $db_location $db_authorization>, where the $db_authorization variable might include an authorized username, password or both.

An advantage of this technique is that the user does not need to manually enter a due date, and cannot accidentally enter an incorrect date. This reduces human effort and human error. An advantage 6f complete electronic communication and storage in the invention is that the records are easily categorized, accessed and stored.

E. Data Backup, Mobility and Synchronization

In the described embodiments, the database resides at the server. In other embodiments, the data can be backed up by the users, taken on a mobile platform such as a laptop computer and synchronized with the server database. In addition to aiding in mobility, these embodiments also aid in case the server to client network (e.g. Internet) is down or in case the server is down for repair.

Figure 18:
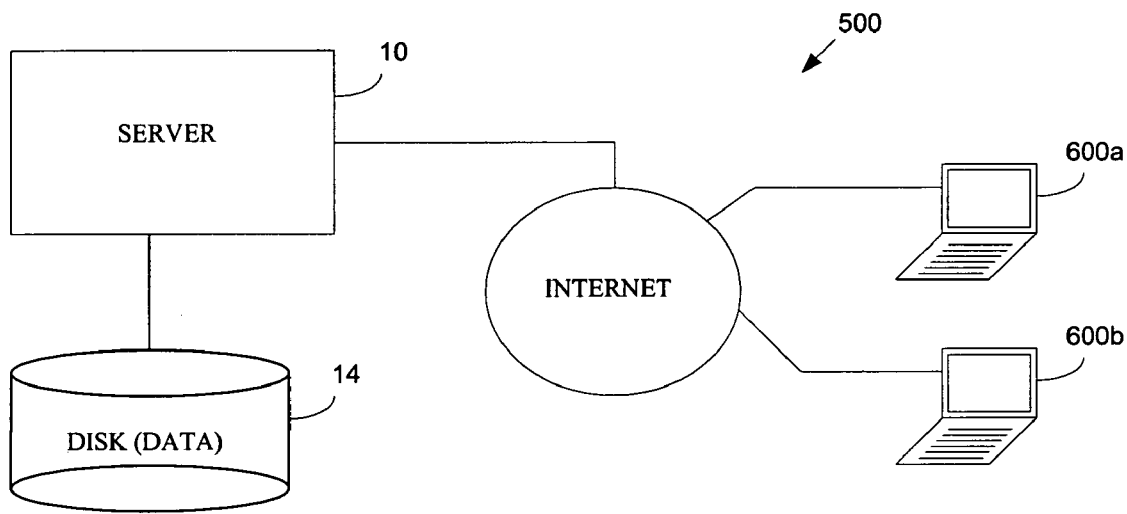
FIGS. 18–20 depict backup, mobility and synchronization of the project records according to an embodiment of the invention.
Figure 19:
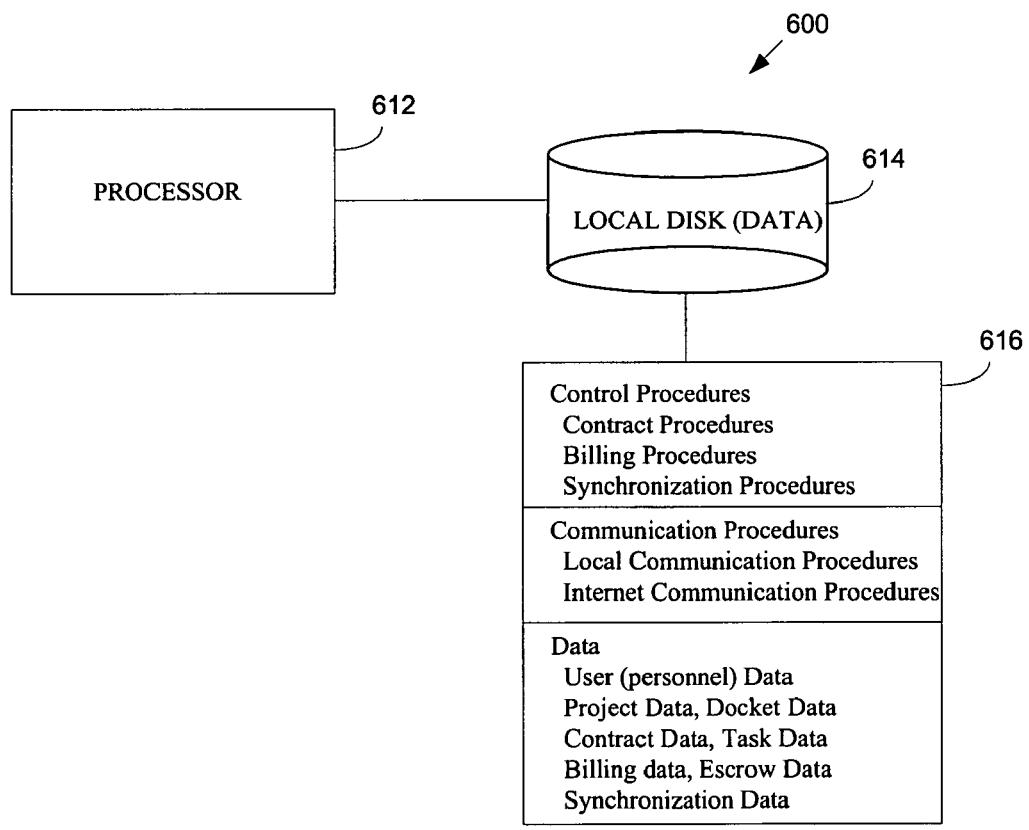
Figure 20:
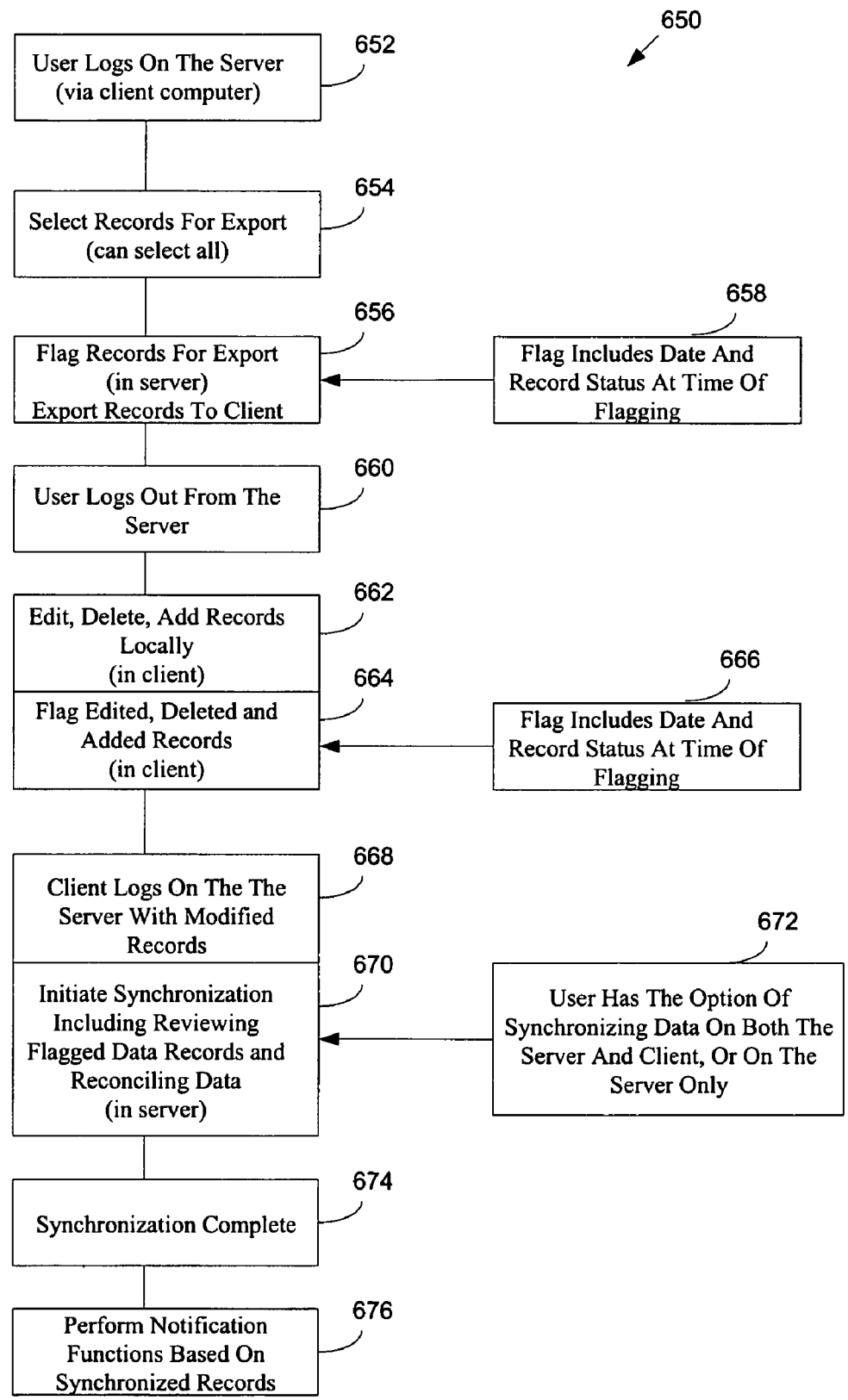

FIGS. 18–20 depict backup, mobility and synchronization of the project records according to an embodiment of the invention. FIG. 18 depicts a network implementation of the invention employing a server 10 as shown in FIG. 1 and a number of clients 600*a*–600*b* connected to the server over the Internet. Often the users will have mobile computers shown in FIG. 19 (e.g. laptops) and will want to access the data while not connected to the Internet. The invention provides for this capability by employing a local database model that can be synchronized with the server database, and if any changes are made to the data, later re-synchronized with the server database.

FIG. 20 is a flow chart 650 showing backup and synchronization of records. In step 652, the user logs on to the server 10, and in step 654, selects the records for export. Step 656 flags the export records in the server and exports the records to the user's local computer 600. This step includes adding the date and time of export to the record. In step 660, the user logs out from the server and the exported records to on the computer 600. The user can view, edit, delete or add records locally in step 662, and step 664 keeps track of all the changes made to the data records on the computer 600. This step includes adding the data and time of changes to the flag. In step 668, the user logs on to the server with the modified records stored on the computer 600. Step 670 synchronizes the records including reviewing flagged records and reconciling the data using the date and time stamps. As shown in step 672, the user has the option of synchronizing data on both the server 10 and the client 600, or on the server only. In step, 674 the synchronization is complete and the server records are all up to date. Step 676 reviews the updated records to determine whether other project personnel should be notified of any changes or due dates present in the data. If notification is warranted, then notifications are sent to the project personnel.

Other considerations on synchronization and storage are as follows. In order to provide effective data backup, the invention flags the records that are scheduled for export to the client computer. If the record is subsequently changed in the client or even on the server, the invention is cognizant of the flag and will store the changes to the original record in a register so that when synchronization occurs later, the records can be reconciled against one another and the proper record status can be associated therewith.

The flagging and storage of record changes has an attendant memory overhead and management issue. That is, storing all the various status and reconciliation information takes memory. Therefore, the user is typically given a choice whether the records are exported for backup purposes or for later synchronization purposes. In case of simple records backup, flags do not necessarily need to be stored for later reconciliation because future synchronization is not selected by the user. In the case where the user wants the option for future synchronization, then the flags are associated with the exported records and the system is prepared for future records reconciliation.

Since the user via the client may not have the capability to perform the notification function, once the records are synchronized, the notification structure performs a notification routine to notify all relevant project personnel to the new status of the records, if necessary.

F. Conclusion

Advantages of the invention include the ability provide flexibility and capabilities of managing tasks, events and due dates, while communicating the updated information to all necessary project personnel. In addition, the ability to control access to authorized personnel at various levels allows users to selectively add, edit, modify and delete project records depending on their access level. Finally, the ability to selectively notify the project personnel based on pre-defined dated or activities keeps all personnel up to date on the project.

The invention has been described with reference to exemplary embodiments. Those skilled in the art will recognize that variations can be made to the description while remaining within the bounds of the claims.

What is claimed is:

1. A project docket management apparatus comprising:
a control structure including a processor configured to execute a control program and communicate with a user;
a memory coupled to the processor and configured to store a plurality of records associated with a project, and a plurality of records storing attributes including access levels associated with a plurality of users;
an authorization structure coupled to the processor and configured to selectively allow the users to log into the control structure and access the records to selectively add, modify and read project records depending on the users' access levels, the authorization structure including administrative access control that allows selectively granting access levels to users; and
a communication structure coupled to the processor including a notification structure configured to periodically distribute information to users based on pre-defined criteria including dates or activities.

2. The apparatus of claim 1, wherein:
the authorization structure provides the ability for a user with an administrative access level to add and modify users and their respective attributes including access levels.

3. The apparatus of claim 1, wherein:
the notification structure is configured to notify a predetermined group of users in advance of a predetermined deadline based at least in part on the users' attributes.

4. The apparatus of claim 1, further comprising:
an approval structure coupled to the processor and configured to receive an approval from a client user regarding a predetermined task, and to notify appropriate users to perform the predetermined task.

5. The apparatus of claim 1, wherein:
the memory is configured to store documents along with attributes including a date stamp; and
the communication structure is configured to electronically publish a document on the Internet and display the date stamp attribute associated therewith.

6. The apparatus of claim 1, further comprising:
a contract administrator structure configured to store agreed upon contract terms and an agreed upon a payment plan and deliverable plan between a buyer of a predetermined service and a seller of a predetermined service;

an escrow structure configured to record a deposit representing an amount of money in an escrow account, according to the agreed upon payment plan; and wherein the escrow structure is configured to record a deliverable representing the seller performing the predetermined service, and when the deliverable is delivered to and approved by the buyer, to transfer from the escrow account the amount or money equal to the agreed upon payment plan.

7. The apparatus of claim 6, wherein:
the communication structure is configured to decode electronic communications to determine dates relevant to the communication; and
the control structure is configured to docket the dates.

8. The apparatus of claim 7, wherein:
the notification structure is configured to notify a predetermined group of users in advance of predetermined deadlines.

9. The apparatus of claim 7, further comprising:
an approval structure coupled to the processor and configured to receive an approval from a client user regarding a predetermined task, and to notify appropriate users to perform the predetermined task.

10. The apparatus of claim 9, wherein:
the notification structure is configured to notify a predetermined group of users in advance of predetermined deadlines.

11. A project docket management apparatus comprising:
a control structure including a processor configured to execute a control program and communicate with a user;
a memory coupled to the processor and configured to store a plurality of records associated with a project, and a plurality of records storing attributes including access levels associated with a plurality of users;
an authorization structure coupled to the processor and configured to selectively allow the users to log into the control structure and access the records to selectively add, modify and read project records depending on the users' access levels; and
a communication structure coupled to the processor including a notification structure configured to periodically distribute information to users based on predefined criteria including dates;
wherein the communication structure includes an electronic filing structure configured to electronically file a document with another computer system; and
wherein the memory is configured to store attributes of the document including a date stamp.

12. The apparatus of claim 11, wherein:
the communication structure is configured to decode electronic communications to determine dates relevant to the communication; and
the control structure is configured to docket the dates.

13. The apparatus of claim 12, wherein:
the notification structure is configured to notify a predetermined group of users in advance of a predetermined deadline based at least in part on the users' attributes.

14. The apparatus of claim 12, further comprising:
an approval structure coupled to the processor and configured to receive an approval from a client user regarding a predetermined task, and to notify appropriate users to perform the predetermined task.

15. The apparatus of claim 14, wherein:
the notification structure is configured to notify a predetermined group of users in advance of a predetermined deadline based at least in part on the users' attributes.

16. The apparatus of claim 1, wherein:
the control structure is configured to synchronize records with a remote computer by flagging downloaded records sent to the remote computer, and at a later time, comparing any uploaded records received from the remote computer, and reconciling the records.

17. The apparatus of claim 16, wherein:
the notification structure is configured to notify a predetermined group of users in advance of a predetermined deadline based at least in part on the users' attributes.

18. A project docket management apparatus comprising:
a server structure including a processor configured to execute a control program and communicate with a user;
a memory coupled to the processor and configured to store a plurality of records associated with a project, and a plurality of records storing attributes including access levels associated with a plurality of users;
an authorization structure coupled to the processor and configured to selectively allow the users to log into the server structure and access the records to selectively add, modify and read project records depending on the users' access levels, the authorization structure including administrative access control that allows selectively granting access levels to users; and
a communication structure coupled to the processor including a notification structure configured to periodically distribute information to users based on predefined criteria including dates or activities.

19. The apparatus of claim 18, wherein:
the authorization structure provides the ability for a user with an administrative access level to add and modify users and their respective attributes including access levels.

20. The apparatus of claim 18, wherein:
the notification structure is configured to notify a predetermined group of users in advance of a predetermined deadline based at least in part on the users' attributes.

21. The apparatus of claim 18, further comprising:
an approval structure coupled to the processor and configured to receive an approval from a client user regarding a predetermined task, and to notify appropriate users to perform the predetermined task.

22. The apparatus of claim 18, wherein:
the memory is configured to store documents along with attributes including a date stamp; and
the communication structure is configured to electronically publish a document on the Internet and display the date stamp attribute associated therewith.

* * * * *